(12) United States Patent  (10) Patent No.: US 7,489,305 B2
Salisbury et al.  (45) Date of Patent: Feb. 10, 2009

(54) TOUCH SCREEN CONTROL

(75) Inventors: Richard Salisbury, Cambridge (GB);
Peter Haigh, Cambridgeshire (GB)

(73) Assignee: Thermoteknix Systems Limited (GB)

( * ) Notice: Subject to any disclaimer, the term of this patent is extended or adjusted under 35 U.S.C. 154(b) by 486 days.

(21) Appl. No.: 11/000,604

(22) Filed: Dec. 1, 2004

(65) Prior Publication Data

US 2006/0117108 A1 Jun. 1, 2006

(51) Int. Cl.
*G09G 5/00* (2006.01)
*G06F 3/048* (2006.01)
*G06F 3/033* (2006.01)

(52) U.S. Cl. .................... 345/173; 345/179; 345/428; 345/581; 715/779; 715/808; 715/810; 715/863

(58) Field of Classification Search ......... 345/156–173, 345/179, 184, 428, 581; 715/779, 780, 835, 715/840; 348/207.1, 207.11; 463/36–38
See application file for complete search history.

(56) References Cited

U.S. PATENT DOCUMENTS 5,559,301 A * 9/1996 Bryan et al. ................. 84/653

| | | | |
|---|---|---|---|
| 2001/0011992 A1* | 8/2001 | Juen et al. | 345/156 |
| 2004/0056837 A1* | 3/2004 | Koga et al. | 345/156 |
| 2005/0154798 A1* | 7/2005 | Nurmi | 710/1 |
| 2005/0246645 A1* | 11/2005 | Beam et al. | 715/747 |
| 2006/0001650 A1* | 1/2006 | Robbins et al. | 345/173 |
| 2006/0022955 A1* | 2/2006 | Kennedy | 345/173 |

* cited by examiner

*Primary Examiner*—Henry N Tran
(74) *Attorney, Agent, or Firm*—Salter & Michaelson

(57) ABSTRACT

A digital imaging device is provided with a touch sensitive display screen 10. The screen 10 displays an image 12 captured by the imaging device. Along one side of the screen is a toolbar 14 upon which is provided a plurality of individual icons 16. The icons 16 represent particular control functions that may be selected by a user. Examples of such control functions represented by the icons 16 include but are not limited to save, send, retrieve or discard image; rotate, reflect, crop, resize or edit image; compare images; process image (e.g. sharpen, blur, emboss, edge detect, pixelise, apply filter or similar); or vary image properties (e.g. brightness, colour balance, colour depth, contrast, convert to greyscale/black and white, effective surface temperature displayed (for infrared images) or similar). The user can select icons by touching the screen either directly or more preferably by tapping the screen with a suitable implement such as a pen, a stylus or similar. Once a user has selected an icon, further icons may be displayed on the screen to allow the user to operate the selected function as desired.

30 Claims, 1 Drawing Sheet

TOUCH SCREEN CONTROL

TECHNICAL FIELD

The present invention relates to a visual display unit wherein image properties may be adjusted using suitable control means and more particularly to a digital imaging device incorporating such a visual display unit.

BACKGROUND

Digital imaging devices such as digital cameras typically comprise means for capturing an image, means for storing the captured image, and means for displaying the captured image to a user. The means for displaying the image to the user is conventionally a display screen such as a liquid crystal display screen or similar.

It is often desirable to process the displayed image or alter the properties of the displayed image (or the properties of the captured image) to allow a user to see a feature or features displayed in the image more clearly. Typically, the adjustable properties may include brightness, colour balance, contrast etc.

In a particular example, infrared sensing digital cameras are used to monitor the effective surface temperature of an apparatus to identify parts that are currently operational, overheating or under stress. Varying the range of and/or the maximum or minimum surface temperatures displayed in a captured image, allows particular parts at different temperatures to be identified more clearly. This thus enables a person to monitor operation of the apparatus more easily and to detect parts at risk of failure earlier.

To enable this control to be achieved, the imaging device is provided with control means for altering the properties of the displayed image or the properties of the captured image. Conventionally, such control means are embodied as control knobs or switches actuated by twisting, pressing or sliding as appropriate.

Use of conventional control means to vary image properties can however be less than convenient for a user. In particular, if the user wishes to select one of a number of properties to vary or wishes to vary only one end of a range of an image property, then unless the device is provided with a large number of individual switches it is difficult for a user to rapidly and accurately vary the image properties. Additionally, provision of a large number of mechanical switches adds significantly to the size, weight, and cost of such a camera whilst also significantly detracting from the ease of carriage and reliability for such a camera, particularly if the mechanical switches are adapted to function in a harsh environment.

It is thus an object of the present invention to provide an improved means for controlling the properties of an image displayed on a display screen.

SUMMARY OF THE INVENTION

According to a first aspect of the present invention there is provided a digital imaging device comprising means for capturing an image and means for displaying said captured image wherein the means for displaying the captured image is a touch sensitive display screen, said display screen displaying a plurality of icons in addition to the image, wherein a user may select an icon from the plurality of icons by touching the area of the screen upon which the icon is displayed, and thereby control or vary properties of the displayed image.

This thus provides a simple and accurate means by which a user can control or vary the properties of the displayed image.

The screen may be adapted to be sensitive to being touched or tapped by a user or by an implement such as a pen, a stylus or similar wielded by a user.

The plurality of icons may be provided on a toolbar. Said toolbar may be displayed along one side of the screen. Each icon in the plurality of icons may correspond to a different image property.

Touching or tapping an icon corresponding to a particular image property causes information relating to the image property and/or control icons to be provided on an action bar, which may be displayed at a side of the screen. In the case of some image properties, information relating to the image properties is displayed until the action bar is touched or tapped at which point a control icon or icons are displayed.

Control icons may have a plurality of different portions each portion having a different function to the other portions of the control icon when touched or tapped. In one particular embodiment a control icon comprises a first end portion, a second end portion and an intermediate portion.

In such embodiments, touching the first end portion increases the value of a selected image property and touching the second end portion decreases the value of the selected property. Tapping the first/second end portions of the icon may be used to increase/decrease the value of the image property incrementally. Also in such embodiments maintaining touching contact with the first end portion may continuously increase the value of the selected image property and maintaining touching contact with the second end portion may continuously decrease the value of the selected image property. The increase/decrease in the value of the selected image property may be determined by the duration of the touching contact. In some embodiments the increase/decrease in the value of the image property is proportional to the duration of the contact and in alternative embodiments, the rate of increase/decrease in value of the value of the image property is proportional to the duration of the contact.

By touching the intermediate portion of the control icon, the user may define an origin. If the touching contact is maintained, the value of the image property may be varied by dragging the point of contact towards either end portion of the icon. If the point of contact is dragged towards the first end of the icon, the value of the image property may be increased and if the point of contact is dragged towards the second end of the icon, the value of the image property may be decreased. The increase/decrease in the value of the image property may be proportional to the overall displacement of the point of contact from the origin towards either end portion.

If the control icon has not been touched for a predetermined time interval, the action bar may revert to displaying information on the selected image property. Additionally or alternatively, if the user touches or taps an area of the screen other than the action bar, the action bar reverts to displaying information on the selected image property.

The digital imaging device may be operable in the visible and/or the infrared regions of the spectrum. The digital imaging device may be incorporated into another device such a cellular telephone or may be a standalone device. The digital imaging device may be provided with means for storing a plurality of captured images and with means for transferring stored images to an external device.

The image properties that may be controlled and varied include but are not limited to brightness, colour balance, colour depth, contrast, convert to greyscale/black and white, effective surface temperature displayed (for infrared images) or similar. The toolbar icons may also allow a user to perform other standard functions in relation to an image such as, but not limited to, save, send, retrieve or discard image; rotate, reflect, crop, resize or edit image; and compare images or similar. The toolbar icons may additionally allow a user to perform image processing functions such as sharpen, blur, emboss, edge detect, pixelise, apply filter or similar.

For some of the above image properties, it is only necessary to provide a single control icon, for other image properties a plurality of control icons may be displayed. For instance separate control icons may be provided for the upper and lower limits of the value of an image property and a further icon may be provided for the overall range of the value of the image property. In other cases, separate icons may be provided for varying the value of an image property in relation to different colours.

According to a second aspect of the present invention there is provided a method of controlling the properties of an image displayed on a touch sensitive screen, comprising the steps of: displaying a control icon on said screen; and tapping and/or touching the area of the screen upon which the control icon is displayed wherein the control icon has at least two portions, each portion operative to vary the particular image property in a different manner.

The method according to the second aspect of the present invention may incorporate any or all of the above disclosed features as described in relation to the fist aspect of the present invention as desired or as appropriate.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

Figure 1:
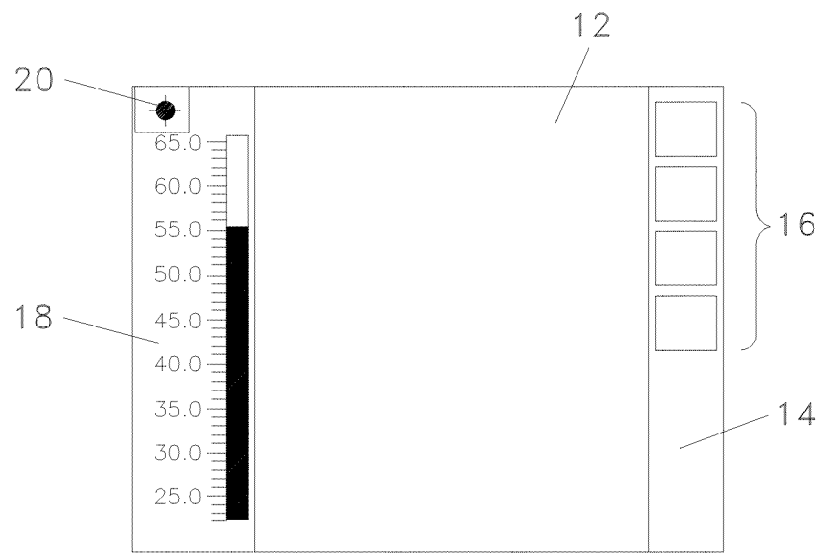
FIG. 1 shows a touch sensitive display screen according to the present invention.

Referring now to FIG. 1, a touch sensitive display screen 10 for a digital imaging device is shown. The screen 10 displays an image 12 captured by the imaging device. Along one side of the screen is a toolbar 14 upon which is provided a plurality of individual icons 16. The icons 16 represent particular control functions that may be selected by a user. Examples of such control functions represented by the icons 16 include but are not limited to save, send, retrieve or discard image; rotate, reflect, crop, resize or edit image; compare images; process image (e.g. sharpen, blur, emboss, edge detect, pixelise, apply filter or similar); or vary image properties (e.g. brightness, colour balance, colour depth, contrast, convert to greyscale/black and white, effective surface temperature displayed (for infrared images) or similar). The user can select icons by touching the screen either directly or more preferably by tapping the screen with a suitable implement such as a pen, a stylus or similar. Once a user has selected an icon, further icons may be displayed on the screen to allow the user to operate the selected function as desired.

Along a second side of the screen is provided an action bar 18. The content displayed in the action bar depend on the selected toolbar icon 16. If selection of a particular toolbar icon 16 necessitates the display of further selectable icons, these are displayed on the action bar 18.

In the embodiment of FIG. 1, the digital imaging device is an infrared camera and the selected icon is the 'effective surface temperature displayed' icon. In this case, the action bar 18 displays a scale indicating to the user how the colours or shades in the image 12 relate to the effective surface temperature of surfaces in the image 12 and an indicator icon 20. In the example of FIG. 1, effective surface temperatures of between around 25° C. and around 65° C. are displayed in the image.

Figure 2:
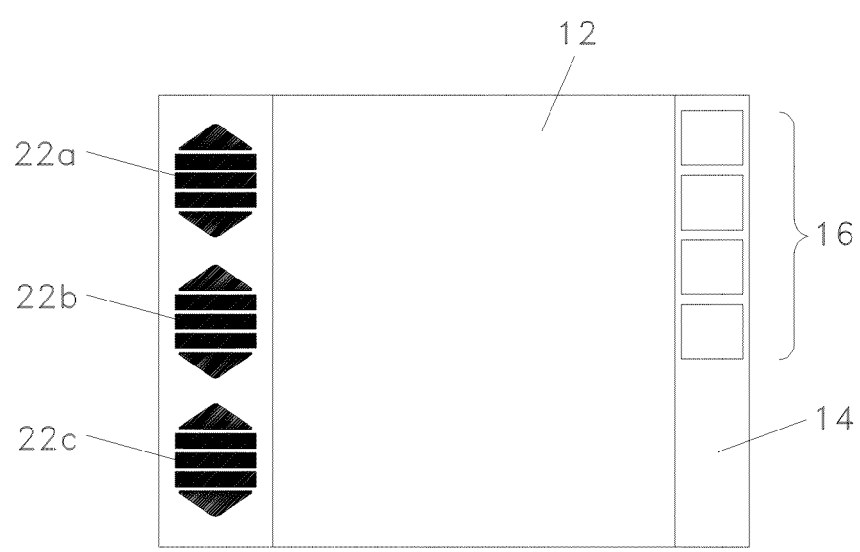
FIG. 2 shows the display screen of FIG. 1, when in a mode whereby image properties may be adjusted by touching bar icons displayed on the screen.

If a user taps on the action bar 18 (or in alternative embodiments on the control icon 20 at the top of the action bar 18) three control icons 22a-c are displayed as is shown in FIG. 2. The control icons 22a-c allow a user to vary the effective surface temperatures displayed in the image 12. Control icon 22a controls the value of the upper limit of effective surface temperature that is displayed in the image 12. Control icon 22c controls the value of the lower limit of effective surface temperature displayed in the image 12. Control icon 22b controls the extent of the range of effective surface temperatures displayed in the image 12.

Figure 3:
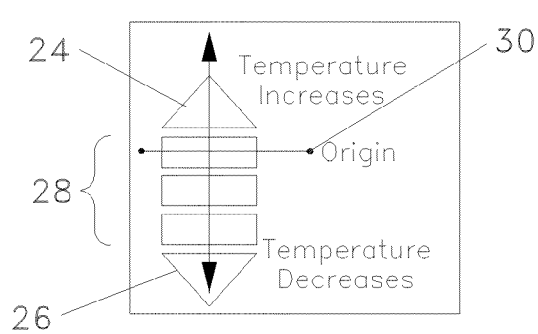
FIG. 3 is an expanded view of one of the bar icons for adjusting image properties.

Referring now to FIG. 3, an expanded view of control icon 22a is shown. The control icon comprises two end portions 24, 26 and an intermediate portion 28. The end portions 24, 26 are in the form of arrowheads, the intermediate portion 28 is in the form of three bars. The upper arrowhead 24 is used to increase the value maximum temperature displayed in the image 12. The lower arrowhead 26 is used to reduce the value of the maximum temperature displayed in the image 12. A user may increase or decrease the value of the maximum temperature incrementally by tapping arrowhead 24 or arrowhead 26 respectively. Alternatively, a user may maintain contact with either one of the arrowheads 24, 26 for a longer duration and the value of the maximum temperature increases/decreases continuously for the duration of the contact. In some embodiments, the increase or decrease in the value of the maximum temperature is proportional to the duration of the contact, in other embodiments however the rate of increase/decrease in the value of the maximum temperature is proportional to the duration of the contact.

The bars 28 additionally allow control of the value of the maximum temperature to be achieved by a different method. In this method, contact with the bar portion defines an origin 30. If the contact is subsequently maintained, movement of the point of contact relative to the origin 30 allows the value of the maximum temperature to be increased or decreased, the value being increased if the point of contact move above the origin 30 and being decreased if the point of contact moves below the origin.

In the example shown in FIG. 3, initial contact has been made with the uppermost of the three bars 28 and thus an origin 30 is defined at that point. For as long as contact is maintained, movement of the point of contact above the origin 30 will increase the value of the maximum temperature and movement of the point of contact below the origin will decrease the value of the maximum temperature. The amount by which the value of the maximum temperature is increased or decreased at any particular time is proportional to how far the point of contact is above or below the origin 30 at that time. When contact is broken, the value of the maximum temperature is fixed until such time as further contact is made. This provides an intuitive way to fine tune the image properties.

Control icons 22b and 22c operate in the same manner to increase/decrease the range of temperatures displayed and to increase/decrease the value of the minimum temperature displayed respectively. When a user has finished varying the values of the displayed effective temperatures, he may cause the action bar to display the temperature scale again by either tapping an area of the screen other than the action bar 18. Additionally or alternatively, the action bar may revert to displaying the temperature scale if there is no contact with the screen within a predetermined time interval.

The above principle can equally be applied to the variation of other image properties. However, if an alternative image property function is selected, more or less control icons 22 can be displayed as necessary. For instance, if image contrast is chosen, only a single control icon 22 may be required to increase or decrease the contrast level in the image whereas colour balance may require three control icons 22 to vary the overall colour balance.

It is of course to be understood that the invention is not to be restricted to the details of the above embodiment which is described by way of example only.

The invention claimed is:

1. A digital imaging device comprising means for displaying an image captured by the imaging device, wherein the means for displaying the captured image is a touch sensitive display screen, said display screen displaying a plurality of icons in addition to the image, each icon in the plurality of icons corresponding to a different image property, said display screen further having an action bar, wherein a user selects an icon from the plurality of icons by touching the area of the screen upon which the icon is displayed causing information relating to the image property and/or control icons to be provided on the action bar displayed at a side of the screen, wherein by touching a portion of said control icon, the user defines an origin and if touching contact is maintained, the value of the image property is varied by dragging the point of contact towards either end portion of the icon
   wherein information relating to the image properties is displayed until the action bar is touched or tapped at which point a control icon or icons are displayed;
   wherein said control icons each have a plurality of different function portions when touched or tapped;
   wherein each control icon comprises at least a first portion and a second portion;
   wherein touching of the first portion increases the value of a selected image property and touching the second portion decreases the value of the selected image property; and
   wherein at least one of the increase or decrease in the value and the rate of increase or decrease in the value of the image property is proportional to the duration of the contact.

2. A digital imaging device as claimed in claim 1 wherein the screen is adapted to be sensitive to being touched or tapped by a user.

3. A digital imaging device as claimed in claim 1 wherein the screen is adapted to be sensitive to being touched or tapped a pen or a stylus wielded by a user.

4. A digital imaging device as claimed in claim 1 wherein the plurality of icons are provided on a toolbar.

5. A digital imaging device as claimed in claim 4 wherein said toolbar is displayed along one side of the screen.

6. A digital imaging device as claimed in claim 1 wherein tapping the first or second portions of the icon is used to increase or decrease the value of the image property incrementally.

7. A digital imaging device as claimed in claim 1 wherein maintaining touching contact with the first portion continuously increases the value of the selected image property and maintaining touching contact with the second portion continuously decreases the value of the selected image property.

8. A digital imaging device as claimed in claim 1 wherein if the point of contact is dragged towards the first end of the icon, the value of the image property is increased and if the point of contact is dragged towards the second end of the icon, the value of the image property is decreased.

9. A digital imaging device as claimed in claim 8 wherein the increase or decrease in the value of the image property is proportional to the overall displacement of the point of contact from the origin towards either end portion.

10. A digital imaging device as claimed in claim 1 wherein the digital imaging device is operable in the visible and/or the infrared regions of the spectrum.

11. A digital imaging device as claimed in claim 1 wherein the digital imaging device is incorporated into another device.

12. A digital imaging device as claimed in claim 1 wherein the digital imaging device is a standalone device.

13. A digital imaging device as claimed in claim 1 wherein the digital imaging device stores a plurality of captured images for transfer to an external device.

14. A digital imaging device as claimed in claim 1 wherein the image properties that are controllable and variable include at least one of brightness, colour balance, colour depth, contrast, or effective surface temperature.

15. A digital imaging device as claimed in claim 1 including toolbar icons that allow a user to perform any one of the following functions in relation to an image: save, send, retrieve image, discard image; rotate, reflect, crop, resize or edit image; and compare images.

16. A digital imaging device as claimed in claim 1 including toolbar icons that additionally allow a user to perform any one of the following image processing functions: sharpen, blur, emboss, edge detect, pixelise, or apply filter.

17. A digital imaging device as claimed in claim 1 wherein separate control icons are provided for the upper and lower limits of the value of an image property and a further icon is provided for the overall range of the value of the image property.

18. A digital imaging device as claimed in claim 17 wherein separate icons are provided for varying the value of an image property in relation to different colours.

19. A digital imaging device comprising means for displaying an image captured by the imaging device, wherein the means for displaying the captured image is a touch sensitive display screen, said display screen displaying a plurality of icons in addition to the image, each icon in the plurality of icons corresponding to a different image property, said display screen further having an action bar, wherein a user selects an icon from the plurality of icons by touching the area of the screen upon which the icon is displayed causing information relating to the image property and/or control icons to be provided on the action bar displayed at a side of the screen, wherein by touching an intermediate portion of said control icon, the user defines an origin and if touching contact is maintained, the value of the image property is varied by dragging the point of contact towards either end portion of the icon
   wherein information relating to the image properties is displayed until the action bar is touched or tapped at which point a control icon or icons are displayed;
   wherein each control icon comprises at least a first end portion and a second end portion and an intermediate portion;
   wherein maintaining touching contact with the first portion continuously increases the value of the selected image property and maintaining touching contact with the second portion continuously decreases the value of the selected image property;

wherein the increase or decrease in the value of the image property is proportional to the duration of the contact.

20. A digital imaging device comprising means for displaying an image captured by the imaging device, wherein the means for displaying the captured image is a touch sensitive display screen, said display screen displaying a plurality of icons in addition to the image, each icon in the plurality of icons corresponding to a different image property, said display screen further having an action bar, wherein a user selects an icon from the plurality of icons by touching the area of the screen upon which the icon is displayed causing information relating to the image property and/or control icons to be provided on the action bar displayed at a side of the screen, wherein by touching an intermediate portion of said control icon, the user defines an origin and if touching contact is maintained, the value of the image property is varied by dragging the point of contact towards either end portion of the icon wherein if the control icon has not been touched for a predetermined time interval, the action bar reverts to displaying information on the selected image property.

21. A digital imaging device comprising means for displaying an image captured by the imaging device, wherein the means for displaying the captured image is a touch sensitive display screen, said display screen displaying a plurality of icons in addition to the image, each icon in the plurality of icons corresponding to a different image property, said display screen further having an action bar, wherein a user selects an icon from the plurality of icons by touching the area of the screen upon which the icon is displayed causing information relating to the image property and/or control icons to be provided on the action bar displayed at a side of the screen, wherein by touching an intermediate portion of said control icon, the user defines an origin and if touching contact is maintained, the value of the image property is varied by dragging the point of contact towards either end portion of the icon wherein if the user touches or taps an area of the screen other than the action bar, the action bar reverts to displaying information on the selected image property.

22. A digital imaging device comprising means for displaying an image captured by the imaging device, wherein the means for displaying the captured image is a touch sensitive display screen, said display screen displaying a plurality of icons in addition to the image, each icon in the plurality of icons corresponding to a different image property, said display screen further having an action bar, wherein a user selects an icon from the plurality of icons by touching the area of the screen upon which the icon is displayed causing information relating to the image property and/or control icons to be provided on the action bar displayed at a side of the screen, wherein by touching an intermediate portion of said control icon, the user defines an origin and if touching contact is maintained, the value of the image property is varied by dragging the point of contact towards either end portion of the icon wherein information relating to the image properties is displayed until the action bar is touched or tapped at which point a control icon or icons are displayed;

wherein each control icon comprises at least a first end portion and a second end portion and an intermediate portion;

wherein maintaining touching contact with the first portion continuously increases the value of the selected image property and maintaining touching contact with the second portion continuously decreases the value of the selected image property;

wherein the increase or decrease in the value of the image property is proportional to the duration of the contact;

wherein the rate of increase or decrease in value of the value of the image property is proportional to the duration of the contact.

23. A method of controlling the properties of an image displayed on a touch sensitive screen, comprising the steps of: displaying a control icon on said screen; said control icon operative to control a particular image property; and tapping and/or touching the area of the screen upon which the control icon is displayed wherein by touching a portion of the control icon, the user defines an origin and when touching contact is maintained, the value of the image property is varied by dragging the point of contact towards either end portion of the icon wherein a plurality of control icons are provided, each control icon operative to control a different image property;

wherein said control icons each have a plurality of different function portions when touched or tapped;

wherein each control icon comprises a first portion and a second portion;

wherein touching the first portion increases the value of a selected image property and touching the second portion decreases the value of the selected image property; and wherein the increase or decrease in the value of the selected image property is at least one of determined by and proportional to the duration of the touching contact.

24. A method as claimed in claim 23 wherein tapping the first or second portions of the icon is used to increase or decrease the value of the image property incrementally.

25. A method as claimed in claim 23 wherein maintaining touching contact with the first portion continuously increases the value of the selected image property and maintaining touching contact with the second portion continuously decreases the value o selected image property.

26. A method as claimed in claim 23 wherein if the point of contact is dragged towards the first end of the icon, the value of the image property is increased and if the point of contact is dragged towards the second end of the icon, the value of the image property is decreased.

27. A method as claimed in claim 26 wherein the increase or decrease in the value of the image property is proportional to the overall displacement of the point of contact from the origin towards either end portion.

28. A method of controlling the properties of an image displayed on a touch sensitive screen, comprising the steps of: displaying a control icon on said screen; said control icon operative to control a particular image property; and tapping and/or touching the area of the screen upon which the control icon is displayed wherein by touching a portion of the control icon, the user defines an origin and when touching contact is maintained, the value of the image property is varied by dragging the point of contact towards either end portion of the icon wherein a plurality of control icons are provided, each control icon operative to control a different image property;

wherein said control icons each have a plurality of different portions, each portion having a different function to the other portions of the control icon when touched or tapped;

wherein each control icon comprises a first end portion, a second end portion and an intermediate portion;

wherein maintaining touching contact with the first end portion continuously increases the value of the selected image property and maintaining touching contact with the second end portion continuously decreases the value of the selected image property;

wherein the increase or decrease in the value of the selected image property is determined by the duration of the touching contact.

29. A method of controlling the properties of an image displayed on a touch sensitive screen, comprising the steps of: displaying a control icon on said screen; said control icon operative to control a particular image property; and tapping and/or touching the area of the screen upon which the control icon is displayed wherein by touching a portion of the control icon, the user defines an origin and when touching contact is maintained, the value of the image property is varied by dragging the point of contact towards either end portion of the icon wherein a plurality of control icons are provided, each control icon operative to control a different image property;

wherein said control icons each have a plurality of different portions, each portion having a different function to the other portions of the control icon when touched or tapped;

wherein each control icon comprises a first end portion, a second end portion and an intermediate portion;

wherein maintaining touching contact with the first end portion continuously increases the value of the selected image property and maintaining touching contact with the second end portion continuously decreases the value of the selected image property;

wherein the increase or decrease in the value of the image property is proportional to the duration of the contact.

30. A method of controlling the properties of an image displayed on a touch sensitive screen, comprising the steps of: displaying a control icon on said screen; said control icon operative to control a particular image property; and tapping and/or touching the area of the screen upon which the control icon is displayed wherein by touching a portion of the control icon, the user defines an origin and when touching contact is maintained, the value of the image property is varied by dragging the point of contact towards either end portion of the icon wherein a plurality of control icons are provided, each control icon operative to control a different image property;

wherein said control icons each have a plurality of different portions, each portion having a different function to the other portions of the control icon when touched or tapped;

wherein each control icon comprises a first end portion, a second end portion and an intermediate portion;

wherein maintaining touching contact with the first end portion continuously increases the value of the selected image property and maintaining touching contact with the second end portion continuously decreases the value of the selected image property;

wherein the rate of increase or decrease in value of the value of the image property is proportional to the duration of the contact.

* * * * *